United States Patent
Stevenson et al.

(10) Patent No.: US 9,606,670 B2
(45) Date of Patent: Mar. 28, 2017

(54) REAL-TIME SPECTRAL NOISE MONITORING FOR PROXIMITY SENSING DEVICE

(71) Applicant: Synaptics Incorporated, San Jose, CA (US)

(72) Inventors: Matthew Stevenson, San Jose, CA (US); Shwetank Kumar, San Jose, CA (US); Chia-yun Kuan, Sunnyvale, CA (US); John Michael Weinerth, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 175 days.

(21) Appl. No.: 14/503,015

(22) Filed: Sep. 30, 2014

(65) Prior Publication Data

US 2016/0092026 A1   Mar. 31, 2016

(51) Int. Cl.
   *G01R 15/18*   (2006.01)
   *G06F 3/041*   (2006.01)
   *G06F 3/044*   (2006.01)

(52) U.S. Cl.
   CPC ............ *G06F 3/0418* (2013.01); *G06F 3/044* (2013.01)

(58) Field of Classification Search
   CPC ........ G06F 3/044; G06F 3/045; G06F 3/0488; G06F 3/04883; G06F 3/07886; G06F 3/0412; G06F 3/0414; G06F 3/0416; G01R 27/2605; G01D 5/24; G01D 5/2415; G01D 5/2412; G01D 5/2417; H01H 11/005; H01H 11/0056; H01H 2924/01079; H01H 2924/01078

USPC .... 324/658–661, 686, 688, 750.17; 345/173, 345/174
   See application file for complete search history.

(56) References Cited

U.S. PATENT DOCUMENTS

| | | | |
|---|---|---|---|
| 7,031,886 | B1 | 4/2006 | Hargreaves |
| 7,876,311 | B2 | 1/2011 | Krah et al. |
| 8,120,591 | B2 | 2/2012 | Krah et al. |
| 8,493,331 | B2 | 7/2013 | Krah et al. |
| 8,519,970 | B2 | 8/2013 | Westhues et al. |
| 8,542,202 | B2 | 9/2013 | Zhuang et al. |
| 8,564,565 | B2 | 10/2013 | Westhues |
| 8,659,556 | B2 | 2/2014 | Wilson |
| 2010/0328256 | A1* | 12/2010 | Harada .................. G06F 3/044 345/174 |
| 2011/0025634 | A1* | 2/2011 | Krah ..................... G06F 3/0412 345/173 |

(Continued)

FOREIGN PATENT DOCUMENTS

| | | |
|---|---|---|
| CN | 201285539 Y | 8/2009 |
| CN | 101719045 A | 6/2010 |

(Continued)

*Primary Examiner* — Thang Le
(74) *Attorney, Agent, or Firm* — Patterson + Sheridan, LLP

(57) ABSTRACT

Techniques for detecting noise with a capacitive sensing device. The includes driving a set of one or more sensor electrodes of a plurality of sensor electrodes with a sensing signal at a first frequency, receiving resulting signals based on the sensing signal for each of the one or more sensor electrodes driven, probing the set of one or more sensor electrodes to obtain a set of probing signals, and summing the probing signals of the set of probing signals to generate a noise-analysis signal.

23 Claims, 10 Drawing Sheets

(56) References Cited

U.S. PATENT DOCUMENTS

| | | |
|---|---|---|
| 2011/0115729 A1* | 5/2011 | Kremin .......... G06F 3/0418 345/173 |
| 2011/0157067 A1 | 6/2011 | Wagner et al. |
| 2012/0013546 A1 | 1/2012 | Westhues et al. |
| 2012/0013565 A1 | 1/2012 | Westhues et al. |
| 2012/0049869 A1* | 3/2012 | Kremin .......... G06F 3/0412 324/679 |
| 2012/0105353 A1* | 5/2012 | Brosnan .......... G06F 3/044 345/174 |
| 2012/0182259 A1 | 7/2012 | Han |
| 2012/0268415 A1 | 10/2012 | Konovalov et al. |
| 2013/0027333 A1 | 1/2013 | Nagata |
| 2013/0050132 A1 | 2/2013 | Calpe Maravilla et al. |
| 2013/0176272 A1 | 7/2013 | Cattivelli et al. |
| 2013/0176273 A1 | 7/2013 | Li et al. |
| 2013/0176274 A1 | 7/2013 | Sobel et al. |
| 2013/0222290 A1 | 8/2013 | Choi et al. |
| 2013/0222322 A1 | 8/2013 | Drew |
| 2013/0257767 A1 | 10/2013 | Wu et al. |
| 2013/0271410 A1 | 10/2013 | Krah et al. |
| 2014/0009408 A1 | 1/2014 | Lee |
| 2014/0015768 A1 | 1/2014 | Karpin et al. |
| 2014/0368467 A1* | 12/2014 | Park .......... G06F 3/0412 345/174 |
| 2015/0286335 A1* | 10/2015 | Haga .......... G06F 3/0418 345/174 |
| 2016/0062494 A1* | 3/2016 | Zuber .......... G06F 3/041 345/173 |

FOREIGN PATENT DOCUMENTS

| | | |
|---|---|---|
| CN | 102788910 A | 11/2012 |
| CN | 102841268 A | 12/2012 |
| CN | 103516441 A | 1/2014 |
| WO | WO-9802964 A1 | 1/1998 |

* cited by examiner

REAL-TIME SPECTRAL NOISE MONITORING FOR PROXIMITY SENSING DEVICE

BACKGROUND

Field of the Disclosure

Embodiments generally relate to input sensing and, in particular, to real-time spectral noise monitoring for proximity sensing device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Input objects can be at or near the surface of the proximity sensor device ("touch sensing") or hovering over the surface of the proximity sensor device ("proximity sensing" or "hover sensing"). Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Environmental noise may affect the signals received while operating a proximity sensor device for capacitive sensing. More specifically, various noise signals, such as ambient signals or signals generated by various elements of the proximity sensor device may affect signals received during capacitive sensing. These noise signals may cause the proximity sensor device to incorrectly identify the presence, or absence, of one or more input objects.

As the foregoing illustrates, what is needed in the art are techniques for reducing the impact of noise on proximity sensor devices.

SUMMARY

One example disclosed herein includes an input device. The input device includes a plurality of sensor electrodes configured for capacitive sensing and a processing system. The processing system is configured to drive a set of one or more sensor electrodes of the plurality of sensor electrodes with a sensing signal at a first frequency, receive resulting signals based on the sensing signal for each of the one or more sensor electrodes driven, probe the set of one or more sensor electrodes to obtain a set of probing signals, and sum the probing signals of the set of probing signals to generate a noise-analysis signal.

Another example disclosed herein includes a processing system. The processing system includes a sensor module and a probing module. The sensor module is configured to drive a set of one or more sensor electrodes of a plurality of sensor electrodes with a sensing signal at a first frequency, and receive resulting signals based on the sensing signal for each of the one or more sensor electrodes driven. The probing module is configured to probe the set of one or more sensor electrodes to obtain a set of probing signals, and sum the probing signals of the set of probing signals to generate a noise-analysis signal.

A further example disclosed herein includes a method. The method includes driving a set of one or more sensor electrodes of a plurality of sensor electrodes with a sensing signal at a first frequency, receiving resulting signals based on the sensing signal for each of the one or more sensor electrodes driven, probing the set of one or more sensor electrodes to obtain a set of probing signals, and summing the probing signals of the set of probing signals to generate a noise-analysis signal.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide a capacitive sensing device configured for capacitive sensing of input objects with reduced negative effects from noise. In an example, an input device can include a plurality of sensor electrodes. The input device operates the plurality of sensor electrodes to determine input in a sensing region of the input device. A probing module probes circuitry for receiving signals with the sensor electrodes to generate probing signals. The probing signals are added together and then analyzed with frequency-domain analysis in order to identify frequencies that are substantially free from noise.

Figure 1:
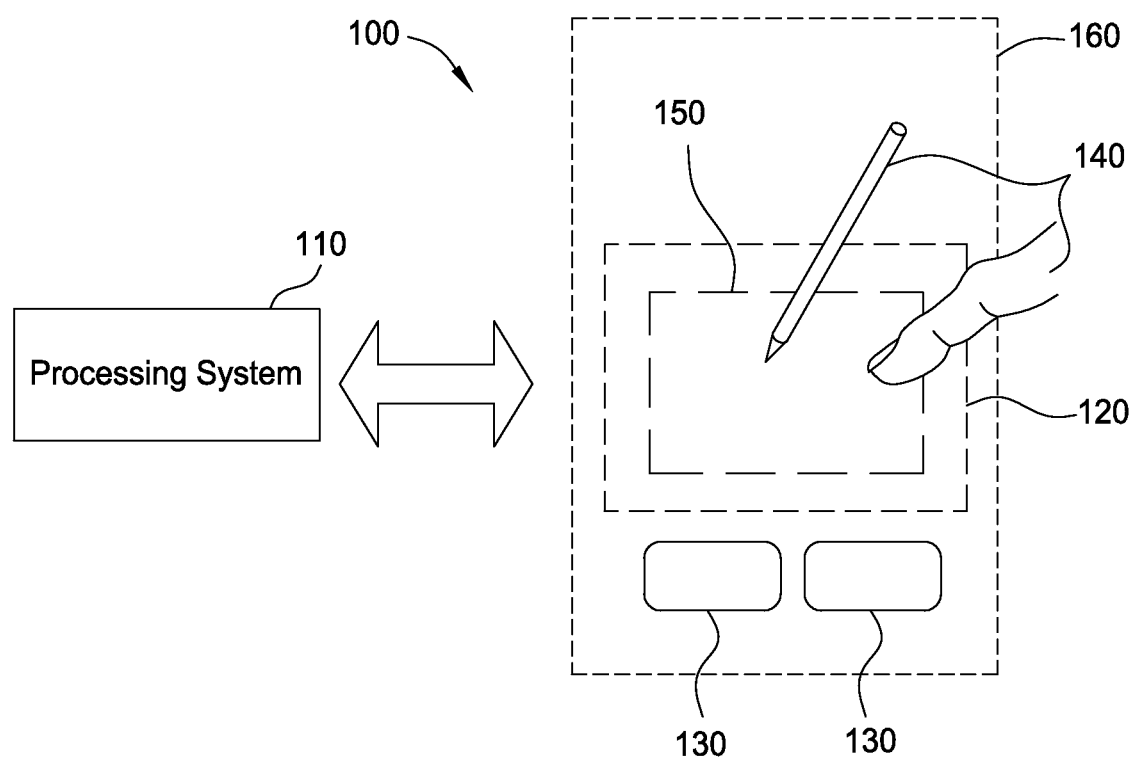
FIG. 1 is a block diagram of a system that includes an input device according to an example implementation.

Turning now to the figures, FIG. 1 is a block diagram of an exemplary input device 100 in accordance with embodiments. In various embodiments, the input device 100 comprises a sensing device and optionally a display device 160. In other embodiments, the input device 100 comprises a display device having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and or parallel connections). Examples include I²C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Example input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments are described in the context of a fully functioning apparatus, the mechanisms of the embodiments are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
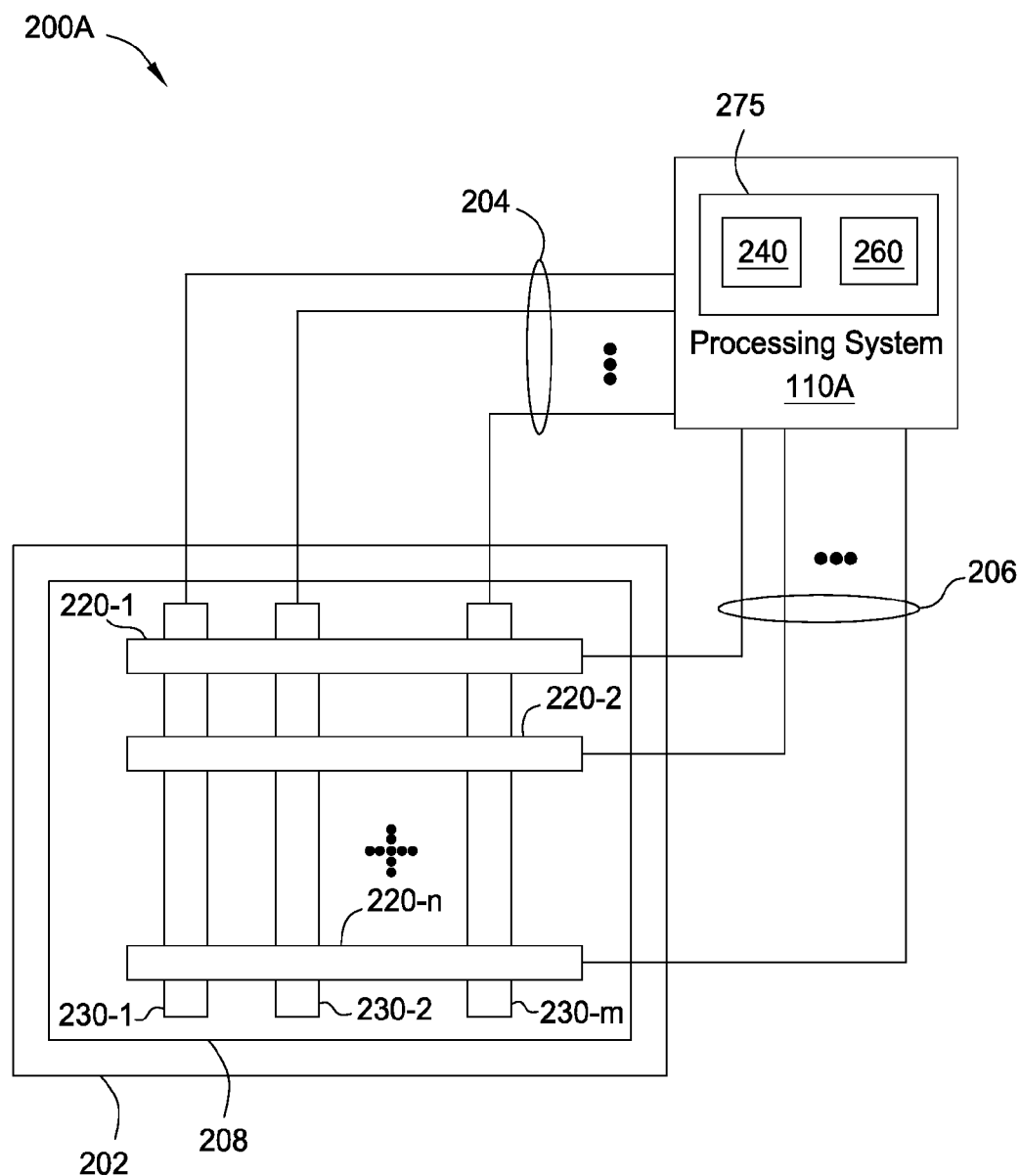
FIG. 2A is a block diagram depicting a capacitive sensor device according to an example implementation.

FIG. 2A is a block diagram depicting a capacitive sensor device 200A according to an example implementation. The capacitive sensor device 200A comprises an example implementation of the input device 100 shown in FIG. 1. The capacitive sensor device 200A includes a sensor electrode collection 208 coupled to an example implementation of the processing system 110 (referred to as "the processing system 110A"). As used herein, general reference to the processing system 110 is a reference to the processing system described in FIG. 1 or any other embodiment thereof described herein (e.g., the processing system 110A, 110B, etc.).

The sensor electrode collection 208 is disposed on a substrate 202 to provide the sensing region 120. The sensor electrode collection 208 includes sensor electrodes disposed on the substrate 202. The sensor electrodes function as sensing elements 150 of the sensor electrode collection 208. In the present example, the sensor electrode collection 208 includes two pluralities of sensor electrodes 220-1 through 220-N (collectively "sensor electrodes 220"), and 230-1 through 230-M (collectively "sensor electrodes 230"), where M and N are integers greater than zero. The sensor electrodes 220 and 230 are separated by a dielectric (not shown). The sensor electrodes 220 and the sensor electrodes 230 can be non-parallel. In an example, the sensor electrodes 220 are disposed orthogonally with the sensor electrodes 230.

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensor electrode collection 208 is shown with the sensor electrodes 220, 230 generally arranged in a rectangular grid of intersections of orthogonal sensor electrodes. It is to be understood that the sensor electrode collection 208 is not limited to such an arrangement, but instead can include numerous sensor patterns. Although the sensor electrode collection 208 is depicted as rectangular, the sensor electrode collection 208 can have other shapes, such as a circular shape.

As discussed below, the processing system 110A can operate the sensor electrodes 220, 230 according to a plurality of excitation schemes, including excitation scheme(s) for mutual capacitance sensing ("transcapacitive sensing") and/or self-capacitance sensing ("absolute capacitive sensing"). In a transcapacitive excitation scheme, the processing system 110A drives the sensor electrodes 230 with transmitter signals (the sensor electrodes 230 are "transmitter electrodes"), and receives resulting signals from the sensor electrodes 220 (the sensor electrodes 220 are "receiver electrodes"). The sensor electrodes 230 can have the same or different geometry as the sensor electrodes 220. In an example, the sensor electrodes 230 are wider and more closely distributed than the sensor electrodes 220, which are thinner and more sparsely distributed. Similarly, in an embodiment, sensor electrodes 220 may be wider and/or more sparsely distributed. Alternatively, the sensor electrodes 220, 230 can have the same width and/or the same distribution.

The sensor electrodes 220 and the sensor electrodes 230 are coupled to the processing system 110A by conductive routing traces 204 and conductive routing traces 206, respectively. The processing system 110A is coupled to the sensor electrodes 220, 230 through the conductive routing traces 204, 206 to implement the sensing region 120 for sensing inputs. Each of the sensor electrodes 220 can be coupled to at least one routing trace of the routing traces 206. Likewise, each of the sensor electrodes 230 can be coupled to at least one routing trace of the routing traces 204.

Figure 2B:
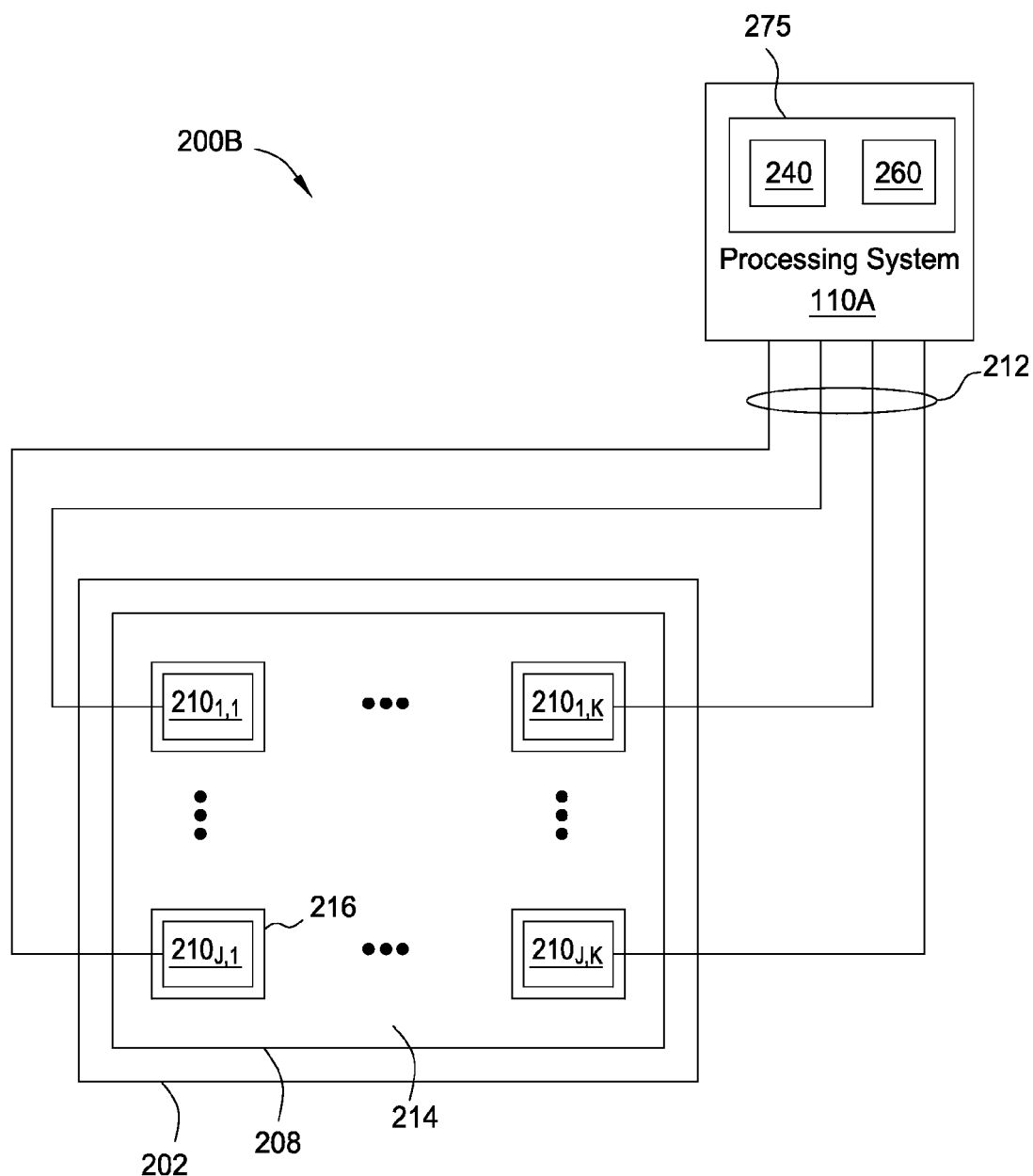
FIG. 2B is a block diagram depicting another capacitive sensor device according to an example implementation.

FIG. 2B is a block diagram depicting a capacitive sensor device 200B according to an example implementation. The capacitive sensor device 200B comprises another example implementation of the input device 100 shown in FIG. 1. In the present example, the sensor electrode collection 208 includes a plurality of sensor electrodes $210_{1,1}$ through $210_{J,K}$, where J and K are integers (collectively "sensor electrodes 210"). The sensor electrodes 210 are capacitively coupled to a grid electrode 214. The sensor electrodes 210 are ohmically isolated from each other and the grid electrode 214. The sensor electrodes 210 can be separated from the grid electrode 214 by a gap 216. In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. Similar to the capacitive sensor device 200A, the processing system 110A can operate the sensor electrodes 210 and the grid electrode 214 according to a plurality of excitation schemes, including excitation scheme(s) for transcapacitive sensing and/or absolute capacitive sensing.

In some examples, the sensor electrodes 210 and the grid electrode 214 can be disposed on separate layers of the substrate 202. In other examples, the sensor electrodes 210 and the grid electrode 214 can be disposed on a single layer of the substrate 202. The electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

The sensor electrodes 210 are coupled to the processing system 110A by conductive routing traces 212. The processing system 110A can also be coupled to the grid electrode 214 through one or more routing traces (not shown for clarity). The processing system 110A is coupled to the sensor electrodes 210 through the conductive routing traces 212 to implement the sensing region 120 for sensing inputs.

Referring to FIGS. 2A and 2B, the capacitive sensor device 200A or 200B can be utilized to communicate user input (e.g., a user's finger, a probe such as a stylus, and/or some other external input object) to an electronic system (e.g., computing device or other electronic device). For example, the capacitive sensor device 200A or 200B can be implemented as a capacitive touch screen device that can be placed over an underlying image or information display device (not shown). In this manner, a user would view the underlying image or information display by looking through substantially transparent elements in the sensor electrode collection 208. When implemented in a touch screen, the substrate 202 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode collection 208.

In another example, the capacitive sensor device 200A or 200B can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensor electrode collection 208.

In general, the processing system 110A excites or drives sensing elements of the sensor electrode collection 208 with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110A drives sensing element(s) of the sensor electrode collection 208 with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110A can determine measurement(s) of capacitance from the sensed charge. In another example, the processing system 110A drives sensing element(s) of the sensor electrode collection 208 with charge and senses resulting respective voltage on sensing element(s). That is, the sensing signal is a signal to cause accumulation of charge (e.g., current signal) and the resulting signal is a voltage signal. The processing system 110A can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110A can include a sensor module 240 and a determination module 260. The sensor module 240 and the determination module 260 comprise modules that perform different functions of the processing system 110A. In other examples, different configurations of one or more modules can perform the functions described herein. The sensor module 240 and the determination module 260 can include circuitry 275 and can also include firmware, software, or a combination thereof operating in cooperation with the circuitry 275.

The sensor module 240 selectively drives sensing signal(s) on one or more sensing elements of the sensor electrode collection 208 over one or more cycles ("excitation cycles") in accordance with one or more schemes ("excitation schemes"). During each excitation cycle, the sensor module 240 can selectively sense resulting signal(s) from one or more sensing elements of the sensor electrode collection 208. Each excitation cycle has an associated time period during which sensing signals are driven and resulting signals measured.

In one type of excitation scheme, the sensor module 240 can selectively drive sensing elements of the sensor electrode collection 208 for absolute capacitive sensing. In absolute capacitive sensing, the sensor module 240 drives selected sensing element(s) with an absolute sensing signal and senses resulting signal(s) from the selected sensing element(s). In such an excitation scheme, measurements of absolute capacitance between the selected sensing element(s) and input object(s) are determined from the resulting signal(s). In an example, the sensor module 240 can drive selected sensor electrodes 220, and/or selected sensor electrodes 230, with an absolute sensing signal. In another example, the sensor module 240 can drive selected sensor electrodes 210 with an absolute sensing signal.

In another type of excitation scheme, the sensor module 240 can selectively drive sensing elements of the sensor electrode collection 208 for transcapacitive sensing. In transcapacitive sensing, the sensor module 240 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor module 240 can drive the sensor electrodes 230 with transmitter signal(s) and receive resulting signals on the sensor electrodes 220. In another example, the sensor module 240 can drive selected sensor electrodes 210 with transmitter signal(s), and receive resulting signals from others of the sensor electrodes 210.

In any excitation cycle, the sensor module 240 can drive sensing elements of the sensor electrode collection 208 with other signals, including reference signals and guard signals. That is, those sensing elements of the sensor electrode collection 208 that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal.

"System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200A or 200B can be located proximate to such a system ground electrode (e.g., located above a ground plane or backplane).

The determination module 260 performs capacitance measurements based on resulting signals obtained by the sensor module 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode collection 208. For example, a capacitive pixel can correspond to a transcapacitive coupling between a sensor electrode 220 and a sensor electrode 230 affected by input object(s). In another example, a capacitive pixel can correspond to an absolute capacitance of a sensor electrode 210. The determination module 260 can determine an array of capacitive coupling changes using the resulting signals obtained by the sensor module 240 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110A can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes 220 and/or the sensor electrodes 230 to produce capacitive profile(s). The array of capacitive coupling changes can include a number of points less than or equal to the number of sensor electrodes along the given axis.

Measurement(s) of capacitance by the processing system 110A, such as capacitive image(s) or capacitive profile(s), enable the sensing of contact, hovering, or other user input with respect to the formed sensing regions by the sensor electrode collection 208. The determination module 260 can utilize the measurements of capacitance to determine positional information with respect to a user input relative to the sensing regions formed by the sensor electrode collection 208. The determination module 260 can additionally or alternatively use such measurement(s) to determine input object size and/or input object type.

As described above, to detect presence of an input object 140 within the sensing region 120, the processing system 110 drives one or more sensor electrodes 210, 220, 230 with a sensing signal and receives resulting signals that include signal components that indicate presence (or lack) of an input object 140 within the sensing region 120. Sensing signals typically have some periodic waveform, such as a square wave, which has a particular fundamental frequency and of course may have harmonic frequencies based on the waveform of the sensing signal. The frequency of the sensing signal is referred to herein as the "sensing frequency." Presence of an input object 140 within the sensing region generally induces some modulation to that waveform, from which capacitive sensing information can be extracted. If a noise source has frequency components that correspond to (e.g., are equal to or are near to) frequencies related to the frequency of the sensing signals (i.e., the fundamental frequency or harmonic frequency of the sensing signal), then the noise source can cause accurate detection of the input object 140 to be difficult.

One possibility for avoiding or mitigating the effects of noise—an approach referred to as "gear shifting"—is to rotate the sensing frequency through a set number of frequencies until a frequency is found at which the effect of noise on the ability to detect presence of an input object 140 is acceptable, or at a minimum level of any of the gear frequencies. However, there are several drawbacks with this approach. For example, according to this approach, the processing system 110 receives at the sensor electrodes 210, 220, 230 for each different frequency at which the level of noise is to be detected. Each instance that the processing system 110 receives at a frequency that is tested for its noise level consumes a particular amount of time. Rotating through a large number of different frequencies may thus consume a large amount of time. Therefore, when configured to test each of the gear frequencies sequentially, potential gears can include only a number of frequencies which can be tested for noise in a reasonable amount of time. By being limited to a certain set of frequencies, gear shifting may not find any potential sensing frequency with sufficiently low noise.

Thus, an approach is provided herein for detecting noise, and updating the sensing frequency, that is considerably faster, more accurate, and more robust than the approach described above in which frequencies are sequentially tested for noise. More specifically, an approach is described herein whereby the processing system 110 drives sensor electrodes 210, 220, 230 with signals while also probing to obtain probing signals that include indications of noise. The processing system 110 performs frequency domain analysis on the probing signals to determine one or more frequencies for which significant noise does not exist. The processing system 110 then chooses one of these frequencies with which to drive sensing signals in subsequent capacitive sensing operations and subsequently drives the sensor electrodes 210, 220, 230 with sensing signals at the chosen frequency.

The approach described herein for detecting noise may be performed while touch sensing is performed, as opposed to in a separate time period (i.e., a separate frame devoted to noise sensing). To prevent the touch sensing signals from being affected, noise may be detected with a high impedance probe. By performing noise detecting while touch sensing is performed, a dedicated noise sensing frame is not used, which may increase the reporting rate (i.e., of reporting touch sensing results) and decreases the sensing latency. The approach described herein may also be performed while touch sensing is not performed.

The technique of "gear shifting" may be used in conjunction with the approach described herein. For example, the processing system 110 may shift to another sensing frequency after performing frequency domain analysis of the probed sensor electrode signals. Using this method, frequency scans in which potential sensing frequency are sequentially received at the sensor electrodes in order to monitor noise level is unnecessary. As disclosed, real time spectral monitoring can allow a larger number of gears (i.e., frequencies that may be switched to for a new sensing frequency) may be monitored for noise. Typical frequency scanning can cause a linear increase in processing time based on the number of gears that are scanned. In contrast, by probing a plurality of the sensor electrodes and performing frequency domain analysis, analysis of additional gears consumes a reduced amount of processing per gear.

As described above, the processing system 110 may drive sensor electrodes 210, 220, 230 for capacitive sensing and receive resulting signals with one or more sensor electrodes 210, 220, 230. The processing system 110 may receive resulting with a single sensor electrode 210, 220, 230. The processing system 110 may also receive resulting signals with multiple sensor electrodes 210, 220, 230 while driving sensor electrodes 210, 220, 230 with a single sensing signal. Each resulting signal includes signal components related to an input object 140 in the sensing region. The resulting signals may also include significant noise components. To obtain and analyze these noise components, the processing system 110 probes receiving circuitry that receives the resulting signals. The signals received via such probing are referred to herein as "probing signals."

For the most part, the noise component of each of the resulting signals (and, consequently, probing signals) have substantially the same waveform, because the waveform generated by the source of the noise is applied to each sensor electrode 210, 220, 230 that is being received with. Of course, various factors may cause the amplitudes of the waveforms of the noise signals present in each different resulting signal to differ, due to differing proximity to the source of the noise or due to other factors such as finger coupled noise. However, again, the waveforms of the noise component of the different resulting signals received with each sensor electrode 210, 220, 230 is generally the same or substantially similar. Thus, the processing system 110 combines (e.g., adds) each of the probing signals that are received with multiple sensing electrodes 210, 220, 230. This adding results in a noise-analysis signal that is the sum of each of the probing signals. The summing may be accomplished either in analog or in digital circuitry. All or some of the summing may also be performed in software. This summed signal has substantially the same waveform as each of the probing signals that are added. Adding the probing signals in this manner provides the benefit that the amount of circuitry for analyzing noise within the probing signals is reduced as compared with having independent noise probing circuitry for each electrode from which probing signals are received.

In one example, referring momentarily to FIG. 2A, the processing system 110 drives and receives with sensor electrodes 210 and 220 in a transcapacitive mode. More specifically, the processing system 110 drives one sensor electrode, such as sensor electrode 220 or sensor electrode 230 and then receives resulting signals with multiple oppositely-oriented sensor electrodes (e.g., if processing system 110 drives a sensor electrode 220, then processing system 110 receives with multiple sensor electrodes 230). Processing system 110 receives probing signals with each of the multiple oppositely-oriented sensor electrodes, sums the probing signals and then performs frequency domain analysis to identify one or more frequencies that include substantially no noise signals.

In another example, referring momentarily to FIG. 2B, processing system 110 drives and receives with sensor electrodes 230 in an absolute capacitive mode. More specifically, processing system 110 drives multiple sensor electrodes 210 and receives resulting signals simultaneously with those driven sensor electrodes 210. Processing system 110 also receives probing signals with each of the driven sensor electrodes 210, sums the probing signals, and performs frequency domain analysis to identify one or more frequencies that includes substantially no noise signals.

The processing system 110 may receive the probing signals at the same time that the processing system 110 receives the resulting signals. Receiving the probing signals and resulting signals at the same time allows the processing system 110 to perform frequency domain analysis at the same time as performing touch sensing, which means that the processing system 110 does not need to utilize a separate, allotted time slot for performing noise detection.

The processing system 110 may include components for performing the frequency domain analysis. Alternatively, the processing system 110 may transmit data associated with the summed probing signal to external components which perform the frequency domain analysis. The processing system 110 may include a central processing unit (CPU) that performs various tasks related to capacitive sensing. The CPU may perform part or all of the frequency domain analysis. The processing system 110 may also include a vector processing unit (VPU) that performs various tasks related to capacitive sensing. The VPU may perform part or all of the frequency domain analysis instead of or in addition to the CPU performing the frequency domain analysis. The VPU may perform part or all of the frequency domain analysis while the CPU is performing tasks unrelated to the frequency domain analysis. The processing system 110 may also include dedicated digital or analog hardware that performs all or part of the frequency domain analysis. The term "processing unit" as used herein may refer to the CPU, VPU, or the dedicated digital or analog hardware.

The frequency domain analysis includes converting the noise-analysis signal (summed probing signals) to the frequency domain and then identifying frequencies that are substantially free of noise. In one example, the frequency domain analysis may include a Fourier Transform algorithm, such as the Fast Fourier Transform algorithm, as is generally known. Briefly, Fourier Transform algorithms convert time-versus-amplitude data into time-versus-frequency data. The frequency domain analysis may include other types of analysis as well. In another example, the frequency domain analysis includes digital down conversion at multiple frequencies followed by applying a low-pass filter to the down-converted signal. Digital down conversion reduces the number of samples in a particular digital sampled signal, which allows subsequent processing of the signal to consume fewer computing resources. Of course, the sample rate to which the signal is down-sampled can only include frequencies up to the associated Nyquist frequency. However, down-sampling the noise-analysis signal (summed probing signals) multiple times to produce multiple down-sampled signals down-sampled by different factors allows multiple down-conversion and low-pass filter operations to be performed, in order to obtain various different frequency components of the summed probing signal.

The processing system 110 may include a probing module that is operatively and selectively coupled to various sensor electrodes 210, 220, 230 in the sensor electrode collection 208. The probing module may include electrical elements that probe the sensor electrodes 210, 220, 230 with high impedance to obtain the probing signals, such that the probing module does not substantially affect received resulting signals.

As described above, the frequency-domain analysis may consist of obtaining frequency-domain (frequency vs. amplitude) data for the noise-analysis signal (summed probing signals). The frequency-domain analysis then consists of examining the frequency-domain data to identify one or more frequencies that does not include a substantial noise component so that processing system 110 may subsequently drive sensor electrodes 210, 220, 230 with signals at that identified frequency.

The processing system 110 identifies frequencies for which no substantial noise exists by examining the amplitude of the frequencies in the frequency domain of the noise-analysis signal, as modified by the frequency domain conversion. Because this signal has a substantial amplitude at the sensing frequency due to the presence of frequency components from the sensing signal, the processing system 110 may perform additional steps in order to determine whether noise exists exactly at or substantially near the sensing frequency.

In one example technique, if the processing system 110 determines that noise exists for frequencies in a fairly wide band surrounding the current sensing frequency, then the processing system 110 may determine that noise is likely to exist at the current sensing frequency. In response, processing system 110 may select a frequency outside of the current sensing frequency, or the wide band surrounding the current sensing frequency at which noise is detected, to drive the sensor electrodes 210, 220, 230 with signals.

In another example technique for identifying noise at the sensing frequency, a signal is transmitted on the sensor electrodes and the sensor electrodes are probed to obtain a set of probing signals. The probing signals are summed to obtain a noise analysis signal and represent the summed time series. Then, a modeled or measured time series of the transmitted signal is subtracted from the noise analysis signal and the resulting modified noise analysis signal should contain only noise. Frequency domain analysis can then be performed to determine noise levels at various frequencies, including the sensing frequency.

In yet another example technique, the processing system 110 may examine the phase of the noise-analysis signal and compare the phase with the phase of the sensing signal. If the phase of the noise-analysis signal is substantially out of alignment with the phase of the sensing signal, then the processing system 110 determines that noise exists at the sensing frequency. This technique allows for detection of narrow-band noise at the sensing frequency.

In a further example technique, the processing system 110 may analyze the frequency components of the frequency-domain spectrum of the summed probing signals that correspond to the fundamental frequency and harmonics of the sensing signal. If the sensing signal is not a perfect sine wave, then the sensing signal includes harmonic components. Further, the processing system 110 is generally set to transmit sensing signals having a particular, known waveform such as a square wave. Such known waveforms have known harmonic structures. For example, a square wave has a second harmonic component with a frequency of three times the frequency of the fundamental frequency and an amplitude of $\frac{1}{3}$ the amplitude of the fundamental frequency, as well as a third harmonic component with a frequency of five times the frequency of the fundamental frequency and an amplitude of $\frac{1}{5}$ the amplitude of the fundamental frequency, as well as other harmonic components as is generally known. This group of harmonics is considered to be the known harmonic structure of a square wave. Of course, various types of sensing signals, with various harmonic structures may be applied to the sensor electrodes 210, 220, 230 for capacitive sensing.

To detect that noise exists at the sensing frequency, the processing system 110 analyzes the frequency components of the summed probing signal that correspond to the harmonics of the sensing signal. Because the harmonic structure for the sensing signal, that is, the ratio of amplitudes for the different harmonics of the sensing signal, is known, the processing system 110 compares the ratio of amplitudes of the summed probing signals at the frequencies of the harmonic structure of the sensing signal to the known harmonic structure of the sensing signal. If at least one frequency component has a higher amplitude than that frequency component "should be," according to the harmonic structure of the sensing signal, then the processing system 110 determines that noise exists for a frequency component corresponding to either the fundamental frequency of the sensing signal or a harmonic frequency of the sensing signal. Because noise at either the fundamental frequency or a harmonic frequency of the sensing signal may affect the ability to detect presence of an input object 140 in the sensing region 120, the processing system 110 chooses a frequency for sensing having harmonics that do not overlap with the frequency at which the processing system 110 has determined noise exists. This technique allows for detection of narrow-band noise at the sensing frequency.

Although the processing system 110 has been described as performing the frequency-domain analysis described above, other components, such as an external computing system, may perform some or all of the frequency-domain analysis.

The disclosed method of real-time spectral monitoring may be used in combination with an active pen. An active pen, or stylus, is an input device that allows users to write or draw on a surface, often proximity sensor device. It also includes electronic components that consume some amount of power in order to improve writing performance or enable another function such as communication with a proximity sensor device or host device. With an active pen, the processing system 110 can dynamically switch between different frequencies for touch sensing. The techniques described above can be used to identify which frequencies for the active pen have more noise and, additionally, which frequencies to use for a data stream associated with the active pen.

Although described above as being performed while touch sensing is occurring, the noise sensing techniques described above may be performed while touch sensing is or is not being performed. Noise sensing may also be performed for an active pen while touch sensing is or is not being performed.

It should also be noted that one or more interference metrics that can be used without the disclosed real time spectral monitoring may continue to be used even if the one or more interference metrics are no longer required or are in some way less essential.

Figure 3:
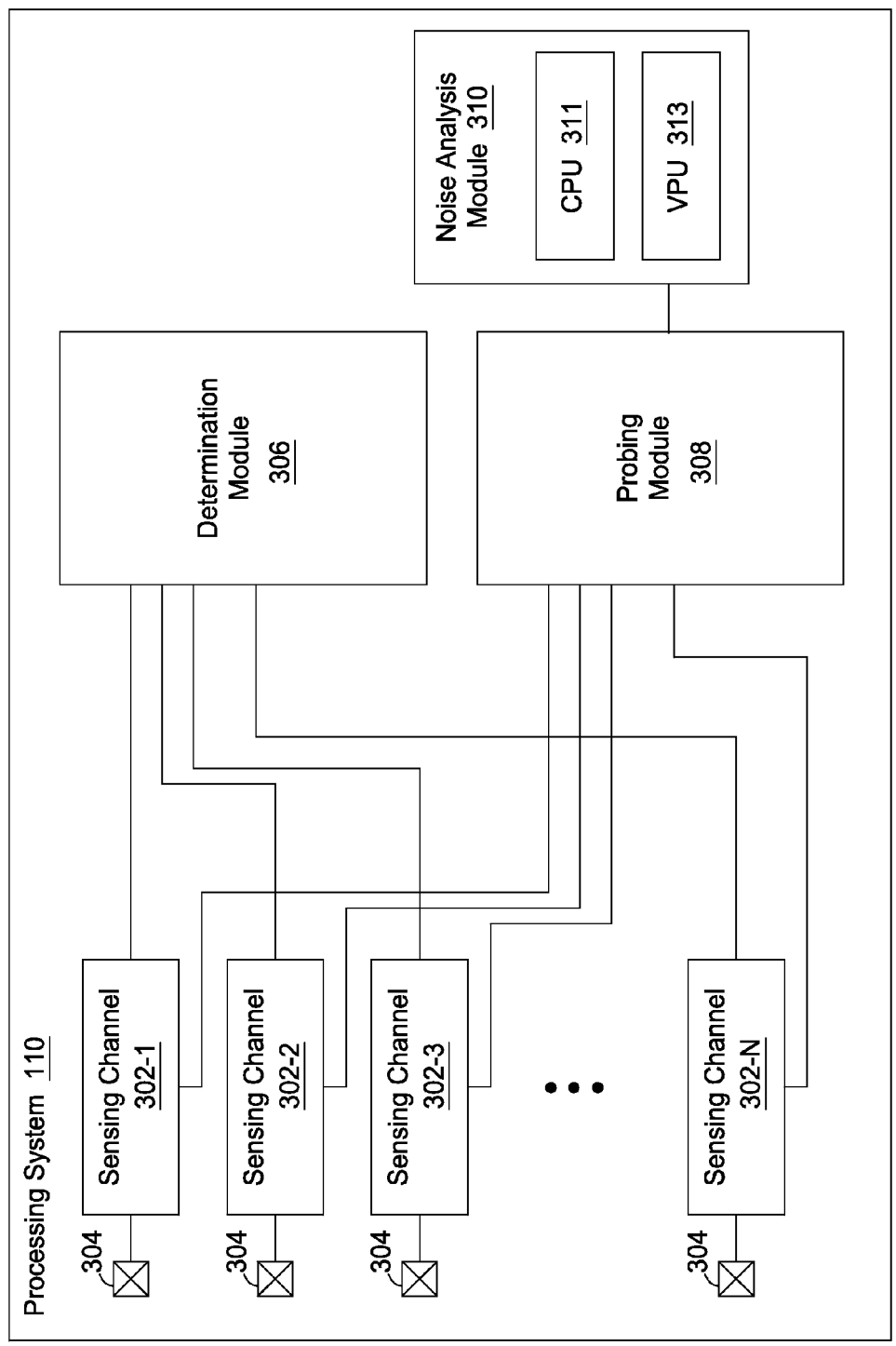
FIG. 3 is a block diagram of an example implementation of the processing system illustrated in FIGS. 2A and 2B according to an example implementation.

FIG. 3 is a block diagram of an example implementation of the processing system 110 illustrated in FIGS. 2A and 2B. For clarity and ease of discussion, certain portions of the processing system 110 are not illustrated in FIG. 3. The processing system 110 includes a plurality of sensing channels 302 that are coupled to a plurality of electrode couplers 304. The electrode couplers 304 selectively couple the sensing channels 302 to sensor electrodes 210, 220, 230. The sensing channels 302 are each coupled to the determination module 306, which determines position and other characteristics of an input object 140 within the sensing region 120. The sensing channels 302 are also coupled to probing module 308, which probes each sensing channel 302 to obtain probing signals, sums the probing signals to generate a noise-analysis signal, and transmits the noise-analysis signal to the noise analysis module 310. The noise analysis module 310 performs the frequency-domain analysis described above. As described above, in some embodiments, the noise analysis module 310 may include an analog-to-digital converter, a CPU 311 within the processing system 110, a VPU 313 within the processing system 110, and/or other circuitry or components for processing data outside of the processing system 110.

In a transcapacitive sensing mode, the sensing channels 302 function as receiver channels. In other words, the sensing module 240 of FIGS. 2A and 2B drives one or more sensor electrodes 210, 220, 230 as transmitter electrodes. The electrode couplers 304 couple the sensing channels 304 to one or more other sensor electrodes 210, 220, 230 to act as receiver electrodes, and receive resulting signals with those receiver electrodes. The determination module 306 receives the resulting signals and determines position information for input objects within the sensing region 120 based on the resulting signals. The probing module 308 receives probing signals from two or more sensing channels 302, adds the probing signals together to generate a noise-analysis signal, and transmits the noise-analysis signal to the noise-analysis module 310 for analysis as described above.

In one example of a transcapacitive sensing scheme, referring momentarily to FIG. 2A, sensing module 240 transmits a signal onto a sensor electrode 220-1. The sensing channels 302 receive resulting signals with each of the oppositely-oriented sensor electrodes 230-1 through 230-$m$ and transmits those resulting signals to determination module 306. Probing module 308 receives probing signals with each of the sensing channels 302 and sums the probing signals to obtain a noise-analysis signal, transmitting the noise-analysis signal to the noise analysis module 310 for analysis. In this example transcapacitive sensing scheme, sensing module 240 transmits, in sequence, with each different sensor electrode 220, and, for each sensor electrode 220, sensing channels 302 receive resulting signals with each different oppositely-oriented sensor electrode 230. Thus, a noise-analysis signal is obtained for each time period that each sensor electrode 220 is driven. In various alternatives, probing module 308 senses for only some of the sensor electrodes 220 rather than all sensor electrodes 220 in sensor electrode collection 208 and/or some of the sensor electrodes 230 rather than all sensor electrodes 230 in sensor electrode collection 208.

In an absolute sensing mode, the sensing channels 302 function both to drive the sensor electrodes 210, 220, 230 and to receive resulting signals with the sensor electrodes 210, 220, 230. As with the transcapacitive sensing mode, the determination module 306 receives these resulting signals and determines position information of an input object 140 within the sensing region 120. The probing module 308 obtains probing signals from the sensing channels 302, sums the probing signals to obtain a noise-analysis signal, and transmits the noise analysis signal to the noise-analysis module 310 for analysis as described above.

In addition to utilizing real-time spectral monitoring for gear shifting, it may be used for a variety of other purposes. For example firmware noise mitigation techniques may be enabled and performed as part of a noise state machine. In an example embodiment, the noise state machine can configure the sensor channels 302 to operate in a high-noise mode in response to an interference metric satisfying a particular threshold. In a high-noise mode, the sensing cycle can be lengthened (i.e., longer integration of the resulting signals), the length of the acquisition bursts can be increased (i.e., each measurement is combined from more sensing cycles), and/or the determination module 260 can invoke one or more noise mitigation algorithms on the measurements. Other types of known noise mitigation techniques can be employed based on the interference metric. In another example, the noise state machine 319 can trigger a spectral analysis in order to identify a new sensing frequency in response to the interference metric satisfying a particular threshold.

FIGS. 4A-4E illustrate different configurations for the probing module 308 in conjunction with an example implementation of the sensing channel 302. In each of the configurations illustrated in FIGS. 4A-4E, the sensing channel 302 includes an operational amplifier 406 with a capacitor coupled between the output of the operational amplifier 406 and the negative input terminal of the operational amplifier 406. A demodulator 404 is coupled to the output of the operational amplifier 406. The demodulator 404 is also part of the sensing channel 302 and functions to remove a carrier wave signal from resulting signals received with the sensing channel 302. While FIGS. 4A-4E illustrate potential embodiments, a variety of others may be used. For example, various combinations of analog and/or digital electronics may follow each op-amp to process signals or perform other functions. The negative input terminal of the operational amplifier 406 is coupled to an electrode coupler 304, which selectively couples a sensing channel 302 to a sensor electrode 210, 220, 230. The different configurations of probing module 308 in FIGS. 4A-4E each probe the signal being received with the sensing channel 302 so that the resulting signals being received by the determination module 306 are not substantially affected by the probing module 308.

Figure 4A:
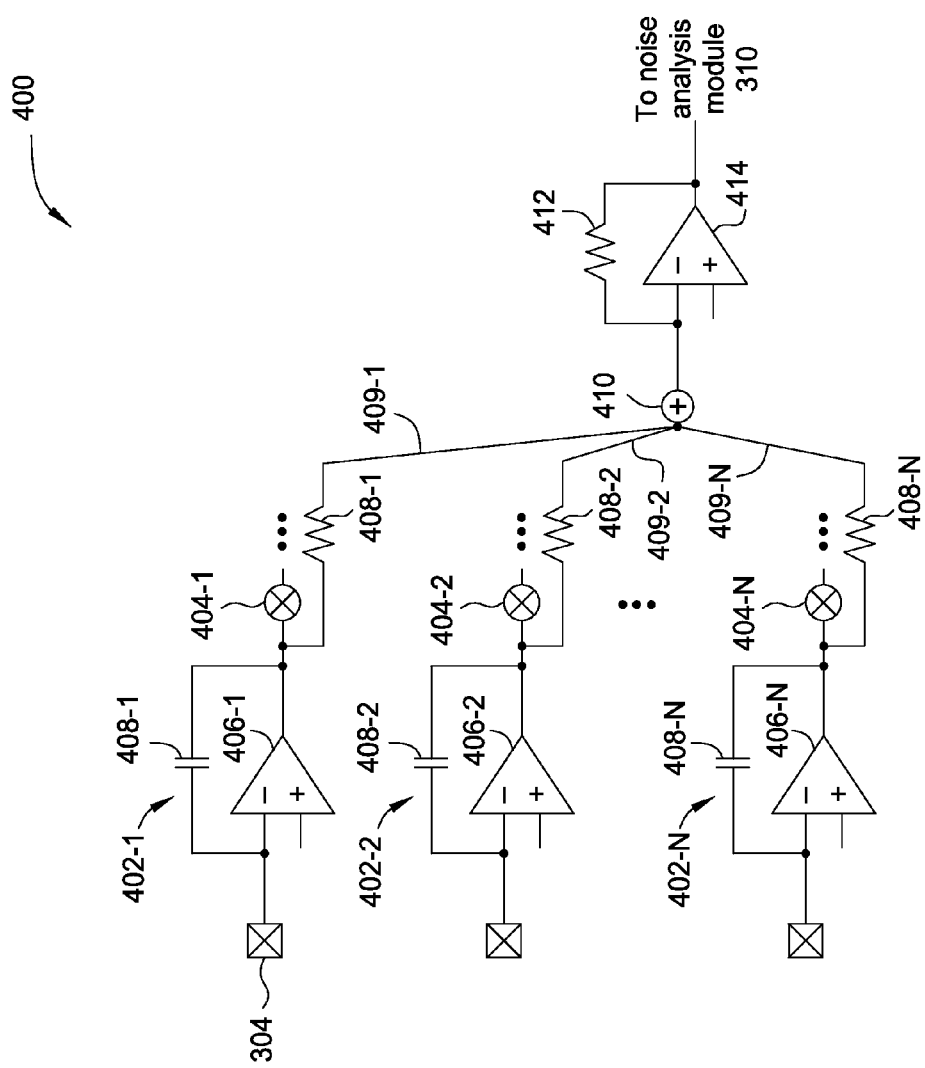
FIGS. 4A-4E illustrate different configurations for the probing module in conjunction with an example implementation of the sensing channel of FIG. 3.

FIG. 4A illustrates an example configuration in which the probing module 308 includes a plurality of resistors 408, coupled to the output of the operational amplifier 406 on one end, and to each other resistor 408 on the other end at junction point 410 via lines 409. Coupling the resistors 408 together in this manner functions to sum the currents that flow through each resistor 408. The probing module 308 further includes an operational amplifier 414 with resistor 412 feedback coupled between the negative input terminal and the output terminal of the operational amplifier 414. The output of the operational amplifier 414 is coupled to the noise analysis module 310, which analyzes received signals for noise.

Figure 4B:
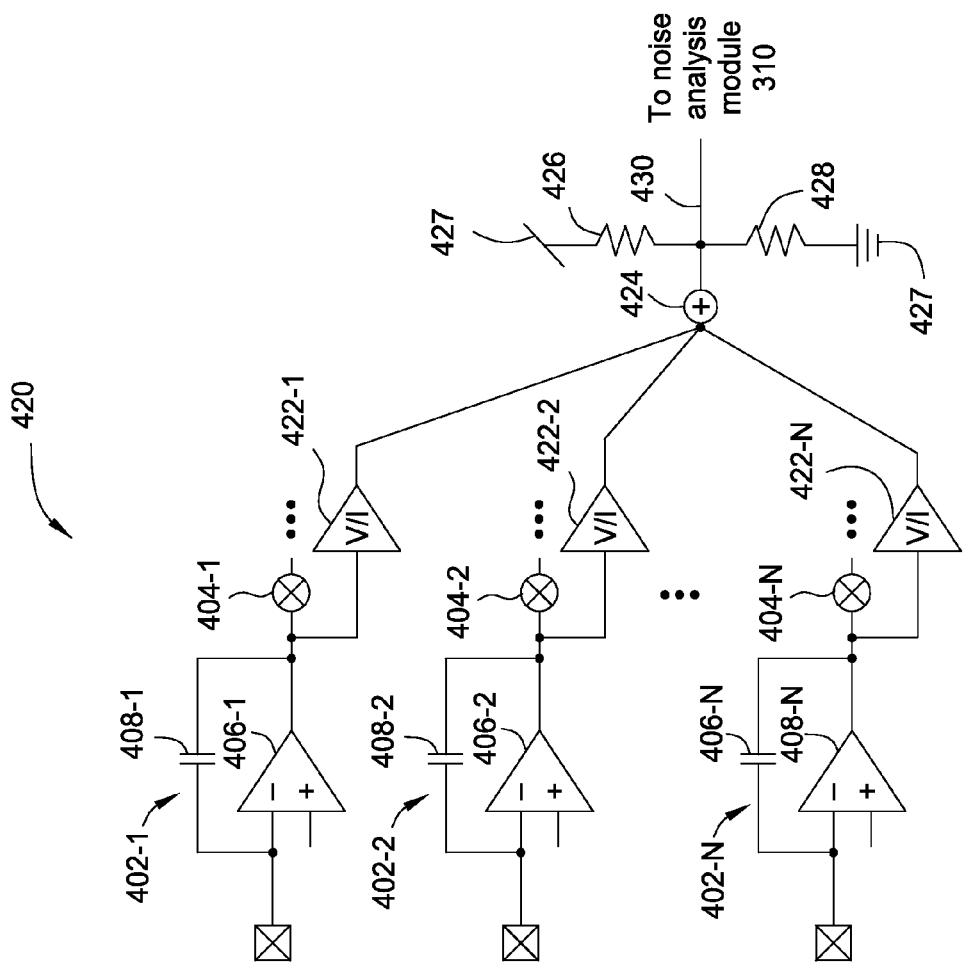

FIG. 4B illustrates an example configuration in which the probing module 308 includes voltage-to-current conversion modules 422. The inputs of each voltage-to-current conversion module 422 are coupled to the output terminal of the operational amplifier 406. The outputs of each voltage-to-current conversion module 422 are coupled together at junction point 424, where the output currents from each voltage-to-current conversion module 422 are summed. Junction point 424 is coupled to first resistor 426, which is coupled to system power 427. Junction point 424 is also coupled to second resistor 428, which is coupled to system ground 429. Junction point 424 is also coupled to output 430, which is coupled to and provides noise-analysis signal to noise analysis module 310.

Figure 4C:
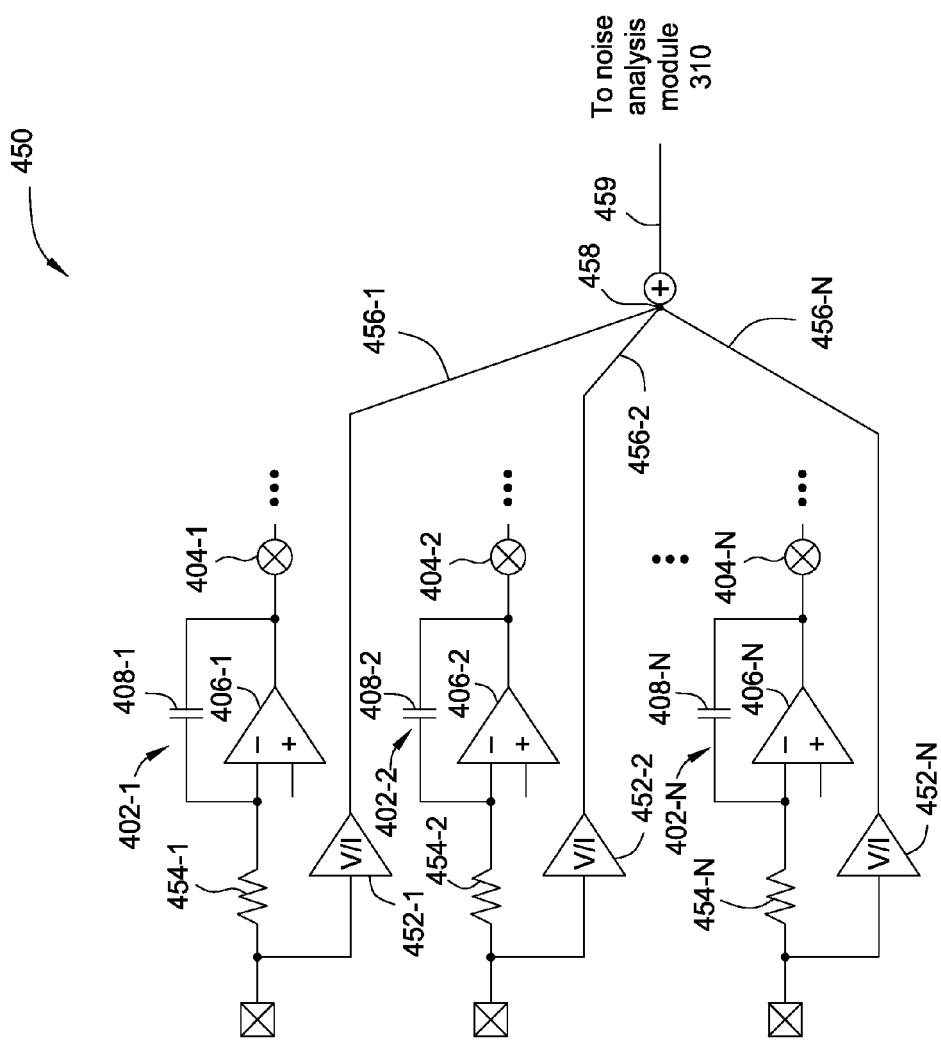

FIG. 4C illustrates an example configuration in which the probing module 308 includes voltage-to-current conversion modules 452 for each sensing channel 302. Inputs of the voltage-to-current conversion modules 452 are coupled to the electrode couplers 304 as well as to resistors 454. The resistors 454 are also coupled to the negative input terminals of the operational amplifiers 406. The outputs of voltage-to-current conversion modules 452 are coupled together at adding point 458, which may simply be a junction point or may have another configuration. The adding point 458 adds the signals received on lines 456 together for provision to noise analysis module 310 via output line 459.

Figure 4D:
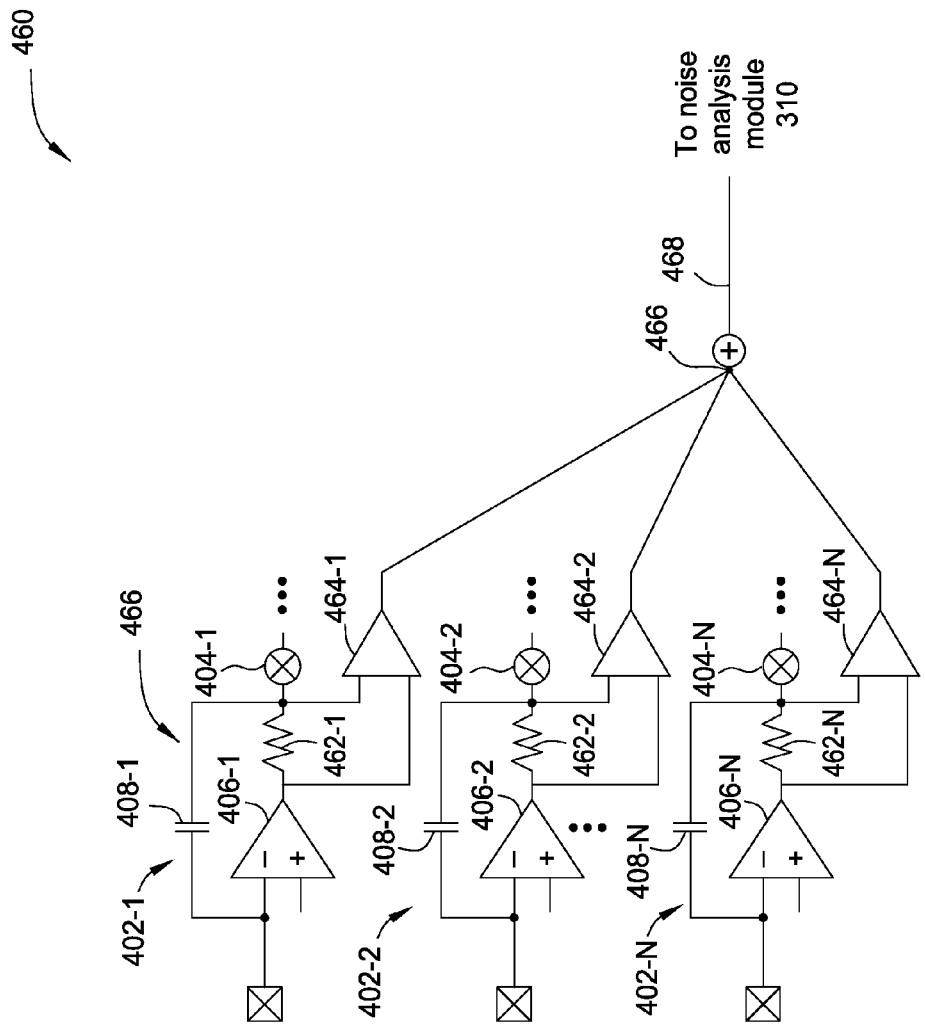

FIG. 4D illustrates an example configuration in which the probing module 308 includes operational amplifiers 464 and resistors 462. The resistor 462 is coupled to the output of the operational amplifier 406 as well as to the demodulator 404 and to the feedback capacitor 408. The sensing channel 466 is slightly different from the sensing channels 302 illustrated and described with respect to FIGS. 4A-4C. More specifically, the sensing channel 466 includes a resistor 462 between the output of the operational amplifier 406 and the demodulator 404 (as well as the capacitor 408 providing capacitive feedback for the sensing channel 302). The two inputs of the operational amplifier 464 of the probing module 308 are coupled across the resistor 462. More specifically, one input of the operational amplifier 464 is coupled to the part of the resistor 462 coupled to the output of the operational amplifier 406 and the other input of the operational amplifier 464 is coupled to the demodulator 404 and feedback capacitor 408. The outputs of the operational amplifiers 464 are coupled together at junction point 466, which sums the signals from the operational amplifiers 464 to produce noise-analysis signal, output on output line 468.

Figure 4E:
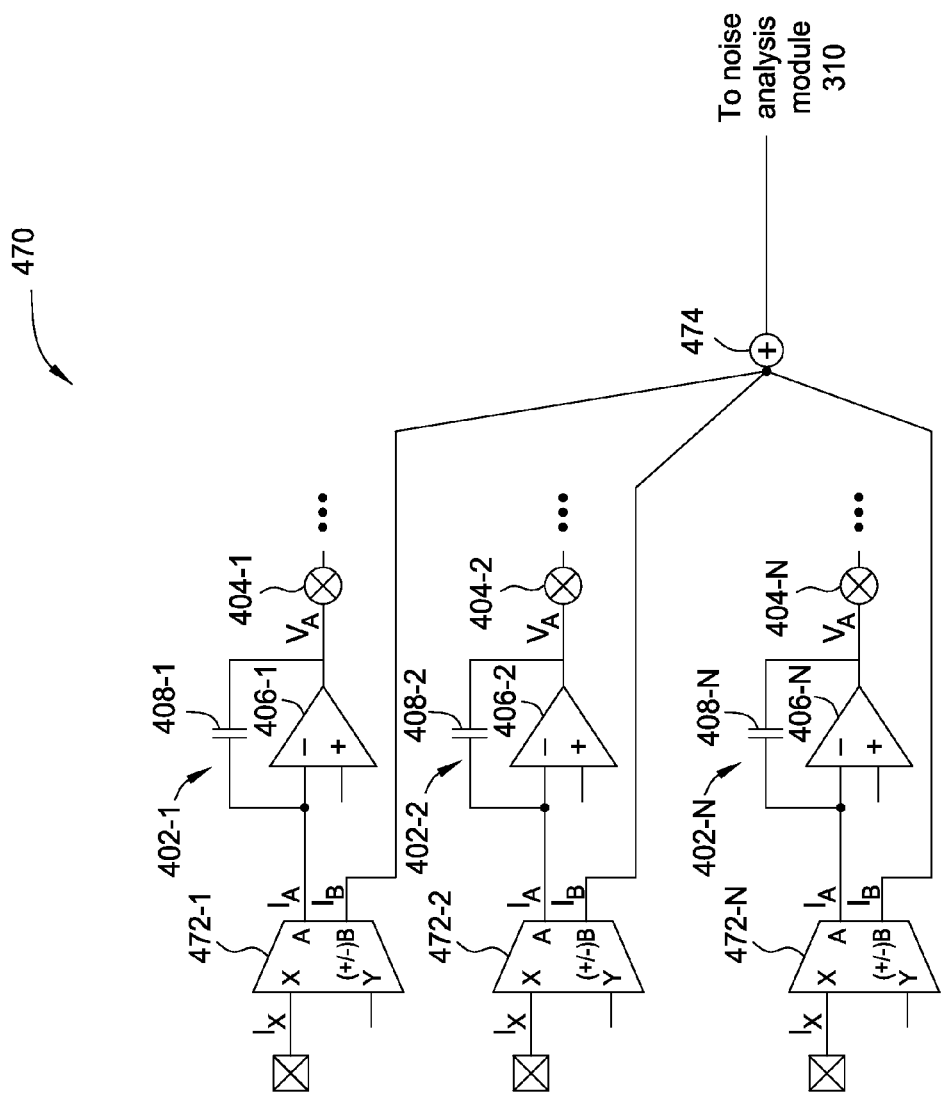

FIG. 4E illustrates an example configuration in which the probing module 308 includes current conveyors 472 for each sensing channel 302. Each current conveyor 472 includes a first input, labeled "X," as well as first output $I_A$ and second output $I_B$. The current convey is configured to replicate, on each output, the current provided to the input. The first input is coupled, through the electrode couplers 304, to sensor electrodes 210, 220, 230. The first output of the current conveyor 472 is coupled to the negative input terminal of the operational amplifier 406 and the second output of the current conveyor 472 is coupled to a junction point 474, which sums all of the currents from the different current conveyors 472 together to generate a noise-analysis signal. Alternatively to the current conveyor, the configuration of FIG. 4E could instead include a current mirror, a high-impedance amplifier, or another module.

Figure 5:
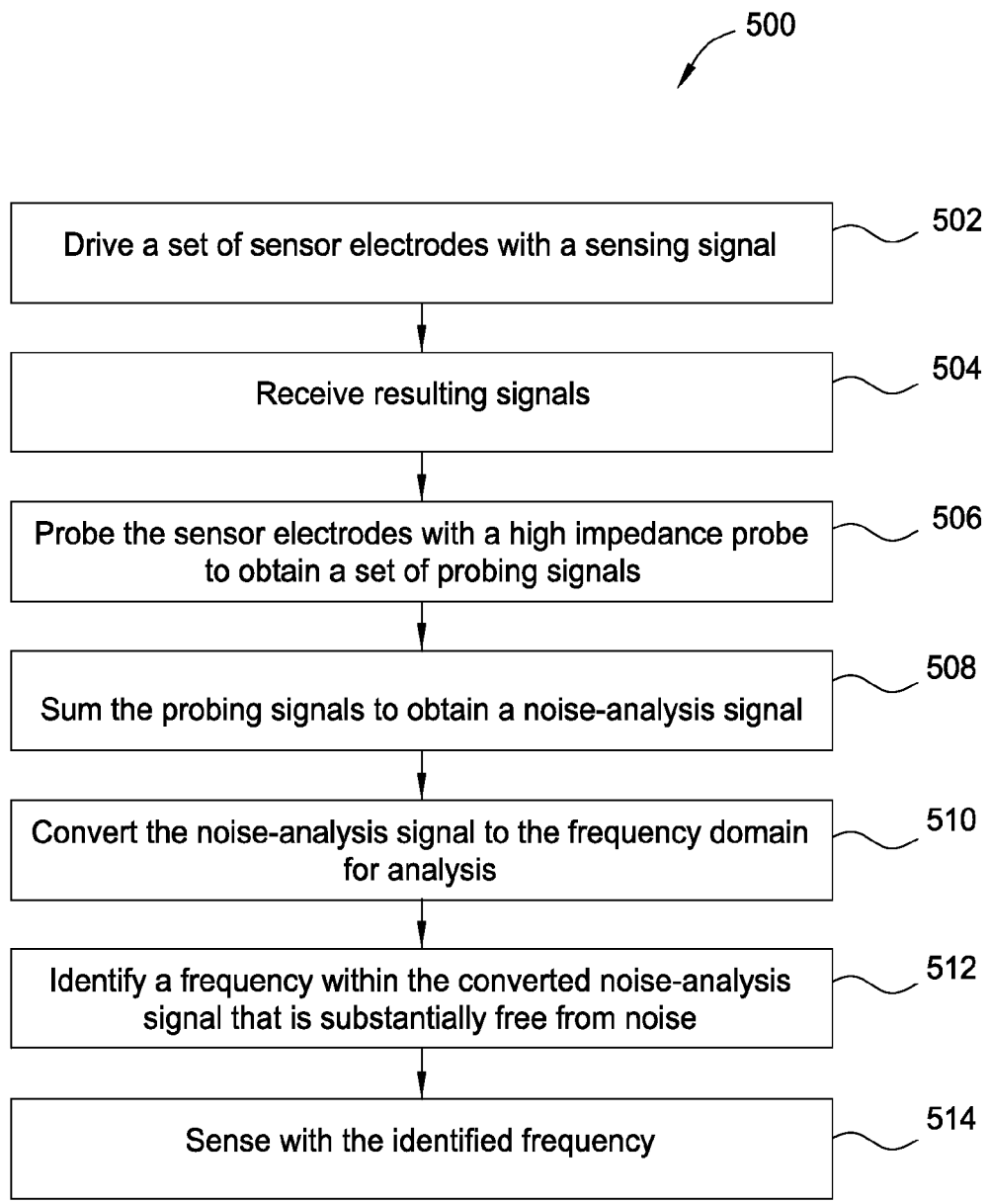
FIG. 5 is a flow diagram of method steps for adjusting a sensing frequency to avoid the effects of noise, according to an example embodiment.

FIG. 5 is a flow diagram of method steps for adjusting a sensing frequency to avoid the effects of noise, according to an example. Although the method steps are described in conjunction with FIGS. 1-4E, persons skilled in the art will understand that any system configured to perform the method steps, in various alternative orders, falls within the scope of the present invention.

As shown, a method 500 begins at step 502, where the processing system 110 drives a set of sensor electrodes 210, 220, 230 with a sensing signal. At step 504, processing system 110 receives resulting signals with the set of sensor electrodes 210, 220, 230. At step 506, which may occur concurrently with step 504, the processing system 110 probes the sensor electrodes 210, 220, 230 to obtain a set of probing signals. At step 508, the processing system 110 sums the probing signals to obtain a noise-analysis signal. At step 510, the processing system and/or another entity converts the noise-analysis signal to the frequency domain for analysis. At step 512, the processing system and/or another entity identifies a frequency within the converted noise-analysis that is substantially free from noise. At step 514, the processing system 110 performs capacitive sensing with the identified frequency.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device comprising:
   a plurality of sensor electrodes configured for capacitive sensing; and
   a processing system configured to:
      drive a set of one or more sensor electrodes of the plurality of sensor electrodes with a sensing signal at a first frequency,
      receive resulting signals based on the sensing signal for each of the one or more sensor electrodes driven,
      probe the set of one or more sensor electrodes to obtain a set of probing signals,
      sum the probing signals of the set of probing signals to generate a noise-analysis signal, and
      process the noise analysis signal to identify a noise-reduced frequency and drive the one or more sensor electrodes with a modified sensing signal at a second frequency based on the noise-reduced frequency.

2. The input device of claim 1, wherein:
   the processing system is configured to probe the set of one or more sensor electrodes to obtain the set of probing signals while a sensor module drives the set of one or more sensor electrodes with the sensing signal.

3. The input device of claim 1, wherein the processing system is further configured to:
   perform frequency domain analysis on the noise-analysis signal to generate frequency domain noise-analysis results, and
   identify the noise-reduced frequency within the frequency domain noise-analysis results.

4. The input device of claim 3, wherein the processing system further comprises:
   a central processing unit (CPU) configured to perform the frequency domain analysis while the processing system drives the set of one or more sensor electrodes with the sensing signal.

5. The input device of claim 3, wherein the processing system further comprises:
   a first processing unit configured to control the driving of the set of one or more sensor electrodes with the sensing signal; and
   a second processing unit configured to perform the frequency domain analysis while the processing system drives the set of one or more sensor electrodes with the sensing signal.

6. The input device of claim 1, wherein the processing system further comprises:
   one or more sensing channels, each sensing channel coupled to a different sensor electrode in the set of one or more sensor electrodes and including an operational amplifier including capacitive feedback between an output and a negative input terminal of the operational amplifier; and
   a probing circuit coupled to each of the one or more sensing channels and configured to:
      probe the set of one or more sensor electrodes to obtain the set of probing signals, and
      sum the probing signals to generate the noise-analysis signal.

7. The input device of claim 6, wherein the probing circuit further comprises:
   one or more resistors, each resistor coupled between the negative input terminal of the operational amplifier of each sensing channel and a sensor electrode that is coupled to the corresponding sensing channel; and
a voltage-to-current converter coupled to each resistor.

8. The input device of claim 6, wherein the probing circuit further comprises:
one or more resistors, each resistor coupled between the output terminal of the operational amplifier of each sensing channel and the feedback path of the operational amplifier; and
a voltage-to-current converter coupled to each resistor.

9. The input device of claim 6, wherein the probing circuit further comprises:
one or more voltage-to current converters configured to couple to the output terminal of the operational amplifier of each sensor electrode in order to probe each sensing channel.

10. The input device of claim 6, wherein the probing circuit further comprises:
a plurality of current conveyors, each current conveyor including a current conveyor input, a first current conveyor output, and a second current conveyor output, the current conveyor input of each current conveyor being coupled to a corresponding sensor electrode, the first current conveyor output of each current conveyor being coupled to the negative input terminal of the operational amplifier of the corresponding sensing channel, and the second current conveyor output of each current conveyor providing current-measuring output for summing.

11. The input device of claim 6, wherein the probing circuit further includes a summing circuit configured to sum the probing signals.

12. A processing system comprising:
a sensor module configured to:
drive a set of one or more sensor electrodes of a plurality of sensor electrodes with a sensing signal at a first frequency, and
receive resulting signals based on the sensing signal for each of the one or more sensor electrodes driven; and
a probing module configured to:
probe the set of one or more sensor electrodes to obtain a set of probing signals,
sum the probing signals of the set of probing signals to generate a noise-analysis signal, and
drive the one or more sensor electrodes with a modified sensing signal at a second frequency based on a noise-reduced frequency identified based on the noise analysis signal.

13. The processing system of claim 12, wherein the probing module is further configured to:
probe the set of one or more sensor electrodes to obtain the set of probing signals while the sensor module drives the set of one or more sensor electrodes with the sensing signal.

14. The processing system of claim 12, further comprising:
a noise-analysis module configured to:
perform frequency domain analysis on the noise-analysis signal to generate frequency domain noise-analysis results, and
identify the noise-reduced frequency within the frequency domain noise-analysis results.

15. The processing system of claim 14, wherein the noise-analysis module further comprises:

a central processing unit (CPU) configured to perform the frequency domain analysis while the sensor module drives the set of one or more sensor electrodes with the sensing signal.

16. The processing system of claim 14, wherein the noise-analysis module further comprises:
a first processing unit configured to control the driving of the set of one or more sensor electrodes with the sensing signal; and
a second processing unit configured to perform the frequency domain analysis while the processing system drives the set of one or more sensor electrodes with the sensing signal.

17. The processing system of claim 12, wherein:
the sensor module comprises one or more sensing channels, each sensing channel coupled to a different sensor electrode in the set of one or more sensor electrodes and including an operational amplifier including capacitive feedback between an output and a negative input terminal of the operational amplifier; and
the probing module comprises:
a probing circuit coupled to the one or more sensing channels and configured to:
probe the set of one or more sensor electrodes to obtain the set of probing signals, and
sum the probing signals to generate the noise-analysis signal.

18. The processing system of claim 17, wherein the probing circuit further comprises:
one or more resistors, each resistor coupled between the negative input terminal of the operational amplifier of each sensing channel and a sensor electrode that is coupled to the corresponding sensing channel; and
a voltage-to-current converter coupled to each resistor.

19. The processing system of claim 17, wherein the probing circuit further comprises:
one or more resistors, each resistor coupled between the output terminal of the operational amplifier of each sensing channel and the feedback path of the operational amplifier; and
a voltage-to-current converter coupled to each resistor.

20. The processing system of claim 17, wherein the probing circuit further comprises:
one or more voltage-to current converters configured to couple to the output terminal of the operational amplifier of each sensor electrode in order to probe each sensing channel.

21. The processing system of claim 17, wherein the probing circuit further comprises:
a plurality of current conveyors, each current conveyor including a current conveyor input, a first current conveyor output, and a second current conveyor output, the current conveyor input of each current conveyor being coupled to a corresponding sensor electrode, the first current conveyor output of each current conveyor being coupled to the negative input terminal of the operational amplifier of the corresponding sensing channel, and the second current conveyor output of each current conveyor providing current-measuring output for summing.

22. The processing system of claim 17, wherein the probing circuit further includes a summing circuit configured to sum the probing signals.

23. A method comprising:
driving a set of one or more sensor electrodes of a plurality of sensor electrodes with a sensing signal at a first frequency;

receiving resulting signals based on the sensing signal for each of the one or more sensor electrodes driven;
probing the set of one or more sensor electrodes to obtain a set of probing signals;
summing the probing signals of the set of probing signals to generate a noise-analysis signal; and
processing the noise analysis signal to identify a noise-reduced frequency and driving the one or more sensor electrodes with a modified sensing signal at a second frequency based on the noise-reduced frequency.

* * * * *